United States Patent [19]

Takenaka et al.

[11] 4,420,163
[45] Dec. 13, 1983

[54] MECHANICAL SEAL

[75] Inventors: Akira Takenaka; Tatsuhiko Fukuoka, both of Toyota, Japan

[73] Assignee: Taiho Kogyo Co., Ltd., Toyota, Japan

[21] Appl. No.: 356,990

[22] Filed: Mar. 11, 1982

Related U.S. Application Data

[63] Continuation of Ser. No. 87,905, Oct. 24, 1979, abandoned.

[30] Foreign Application Priority Data

Oct. 25, 1978 [JP] Japan ............................. 53-131406

[51] Int. Cl.³ .............................................. F16J 15/34
[52] U.S. Cl. .................................................. 277/96.1
[58] Field of Search ........................... 277/96.1, 96 R

[56] References Cited

U.S. PATENT DOCUMENTS

| 3,638,957 | 2/1972 | Marsi | 277/96.1 |
| 3,973,781 | 8/1976 | Grörich | 277/96.1 |
| 4,099,729 | 7/1978 | Nylykke | 277/96.1 |

FOREIGN PATENT DOCUMENTS

| 434388 | 4/1948 | Italy | 277/96.1 |
| 6714250 | 4/1968 | Netherlands | 277/96.1 |

Primary Examiner—Robert I. Smith
Attorney, Agent, or Firm—Flynn, Thiel, Boutell & Tanis

[57] ABSTRACT

A mechanical seal for preventing leakage of a fluid from the outside to the inside of the sliding contact portion between a stationary seating ring and a rotating follower ring. A plane land portion is formed in the peripheral portion of the sliding surface of the follower ring and a plurality of holes are defined in the inside portion of the sliding surface of the follower ring. The above plurality of holes are effective to prevent the leakage of the fluid.

13 Claims, 12 Drawing Figures

F I G. 1
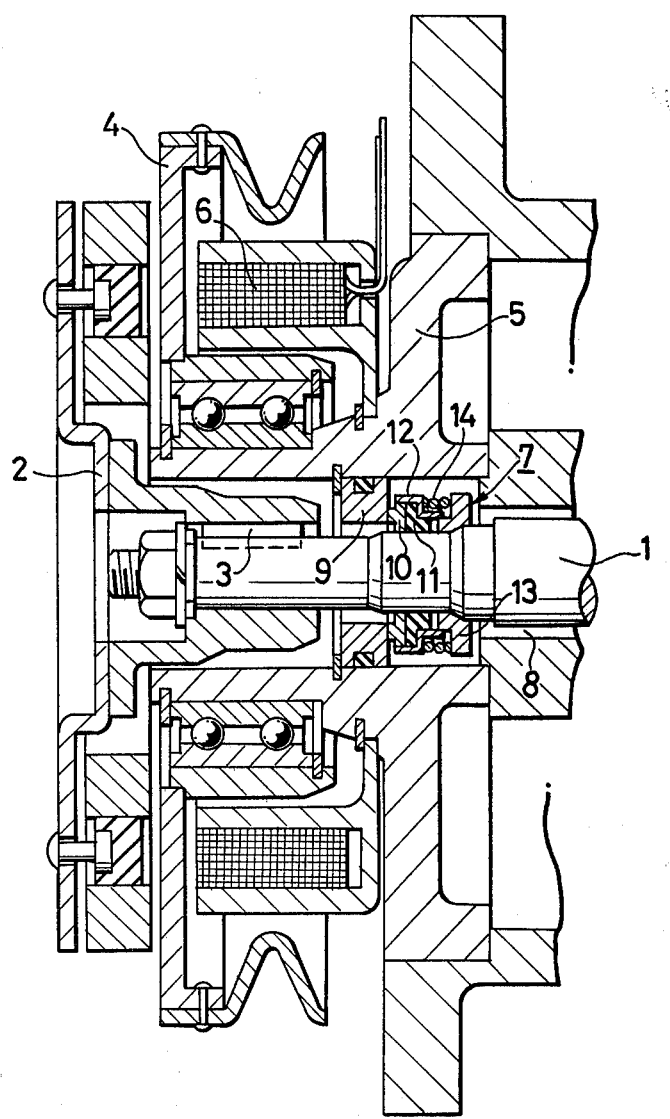

MECHANICAL SEAL

This is a continuation of application Ser. No. 87,905 filed Oct. 24, 1979, and now abandoned.

BACKGROUND OF THE INVENTION

The present invention relates to a mechanical seal for preventing a fluid from leakage through rotary shaft portions. More particularly, the invention relates to an improvement in a mechanical seal which prevents the leakage of fluid when the pressurized sealed fluid is a liquid or a mixture of a gas and a liquid and the external fluid is a gas, generally ambient air.

In a mechanical seal of the above-mentioned kind, a seating ring on the stationary side which receives therethrough a rotary shaft is generally brought into slidable contact with a follower ring which is rotated together with the above rotary shaft, thereby avoiding leakage of the fluid from the outside of the sliding contact portion to the inside thereof. In order to enhance the sealing effect of the sliding contact surfaces in the conventional prior art, the pressure per unit area on the sliding contact surfaces is increased by enlarging the pressure of the follower ring against the seating ring. Or, as another measure, tight sealing surfaces are formed by selecting the material for both rings that are in contact with each other. However, the occurrence of coarsening and other changes, with the passage of time, in the sliding contact surfaces cannot be prevented. Especially, when the mechanical seal is used under severe conditions involving vigorous vibration and large temperature variation, such as those in a compressor for an automobile cooler, the fluid leakage soon becomes serious. Therefore, the proposal of a radical countermeasure has been eagerly desired.

As the fundamental measure for this sealing means, the inventors of the present application have invented a mechanical seal in which at least one of the sliding surfaces of a seating ring and a follower ring is provided with fine grooves having closed outside ends. This mechanical seal has been applied for a patent in the United States (U.S. patent application Ser. No. 895,072).

The invention of the above patent application is characterized in that at least one of the sliding surfaces is provided with fine grooves in certain shapes having closed outside ends. This depends upon the fact that the radial pressure against the leakage flow can be produced by utilizing the relative rotations of the sliding surfaces to the fluid that is held in the minute clearance between the sliding surfaces. It is considered that the effect of leakage prevention can be attained by the pumping action of the fine grooves with the rotation of the follower ring or by the centrifugal force that is exerted on the fluid that enters into the fine grooves when the grooves are formed on the side of the follower ring.

Meanwhile, as the result of further investigations, it has been understood that about the same sealing effect can also be expected when the fine grooves formed in the sliding surface of the follower ring are replaced by a plurality of holes. The holes are arranged on imaginary lines that are inclined rearwardly relative to the rotational direction of the follower ring. Furthermore, it has also been understood that, under the use conditions for the compressor of an automobile cooler, even when a plurality of these holes are formed regularly or irregularly in the inside portion of the sliding surface of the follower ring, about the same or a little less sealing effect can be obtained as compared with the case of the fine grooves. Further, the above-mentioned a little less sealing effect is still better than the sealing effect of the prior art devices. Especially, a very good sealing effect can be obtained during the high speed rotation of the follower ring.

BRIEF SUMMARY OF THE INVENTION

Accordingly, the present invention is characterized in that the outside portion of the sliding surface of a follower ring is formed as a land portion and the inside portion of the sliding surface thereof is provided with a plurality of holes.

It is, therefore, the primary object of the present invention to provide an improved mechanical seal which is free from the disadvantages in the prior art devices and is quite excellent in its sealing effect.

Another object of the present invention is to provide a mechanical seal in which an almost complete sealing fluid film is formed between the sliding contact surfaces by their rotational force without requiring either an increase of the contact pressure therebetween or the selection of the materials thereof.

A further object of the present invention is to provide the conditions of the suitable shapes and locations and so forth for the formation of the aforementioned plurality of holes which are defined in the sliding contact surfaces as the sealing means.

Still a further object of the present invention is to provide a mechanical seal which is durable for prolonged use under severe conditions. This can be attained by the provision of the quite simple measure of forming the above-mentioned plurality of holes in the sliding contact surfaces.

The above-mentioned holes can be formed quite easily by pressing a sliding contact surface against a die which has a plurality of projections without causing the deformation of distortion of the sliding surface. Therefore, it is quite suitable for mass production.

BRIEF DESCRIPTION OF THE DRAWINGS

The nature, priniciple and details of the invention will be more clearly apparent from the following detailed description with respect to preferred embodiments of the invention and the accompanying drawings, in which:

FIG. 1 is a vertical-cross sectional view of an exemplary rotary shaft which is provided with a mechanical seal;

DESCRIPTION OF PREFERRED EMBODIMENTS

Figure 2:
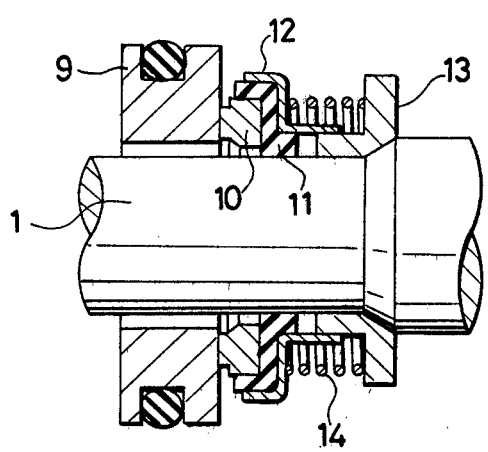
FIG. 2 is an enlarged cross-sectional view of the mechanical seal shown in FIG. 1.

Referring now to the accompanying drawings, several embodiments of the mechanical seals according to the present invention will be described in detail.

As an example of a rotary shaft having a mechanical seal, which is a part of a compressor for an automobile cooler, is shown in FIG. 1. The rotary shaft 1 of the compressor is provided with a connecting member 2 of an electro-magnetic clutch, which member 2 is axially slidably fitted to the rotary shaft 1 by means of a key 3. The rotating member 4 can be rotated relative to the casing 5. Excitation coils 6 are disposed inside the rotating member 4 and when the coils 6 are energized, the rotating member 4 is united with the connecting member 2 so that the rotary shaft 1 is rotated together with the rotating member 4. Further, the mechanical sealing section 7 prevents leakage of the fluid in the compressor section 8 along the rotary shaft 1. A follower ring 10 is slidably engaged with a seating ring 9 which is fitted around the rotary shaft 1. The follower ring 10 is rotated together with the rotary shaft 1 and the leakage of oil or gas through the gap between the rotary shaft 1 and the seating ring 9 can be avoided by the above slidable engagement of the follower ring 10. The packing 11 is closely fitted to the rotary shaft 1 by means of a keep plate 12 and a knock ring 13. The follower ring 10 is urged toward the seating ring 9 by the force of a helical spring 14.

Figure 3:
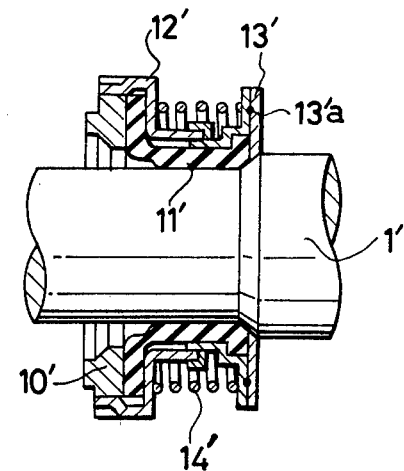
FIG. 3, FIG. 4(A) and FIG. 4(B) are enlarged views of modified examples of the mechanical seal of FIG. 2.
Figure 4A:
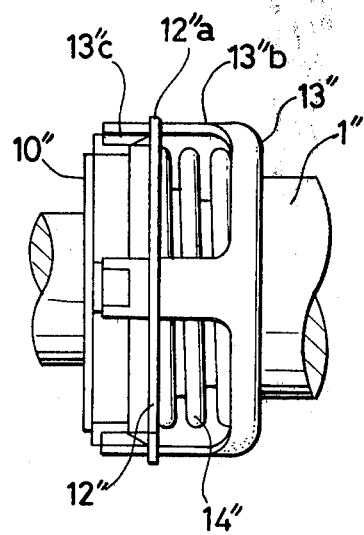
Figure 4B:
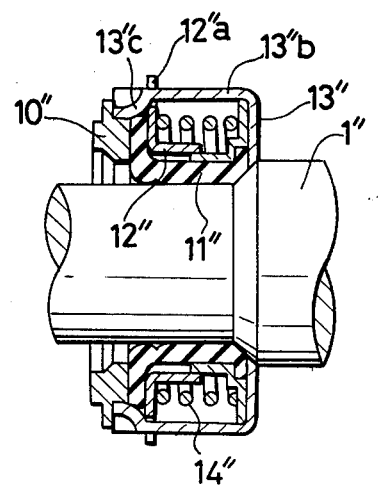

Shown in FIG. 2 is the above-mentioned mechanical sealing section 7 in an enlarged scale. The knock ring 13 shown in FIG. 2 is formed as a relatively thick molded article. FIG. 3 shows another example of the mechanical sealing section 7, in which the members that are the same as or corresponding to those of FIG. 2 are indicated by reference numerals having a prime ('). The knock ring 13' shown in FIG. 3 is one which is made by bending press work and spot-welding of portion 13'a so as to make the product simple and light in weight. FIGS. 4(A) and 4(B) are a side view and a cross-sectional view, respectively, showing a further modified example of the mechanical sealing section 7. In those drawings, the members which are the same as or corresponding to those of FIG. 2 are indicated by reference numerals having double primes ("). In the example shown in FIGS. 4(A) and 4(B), the keep plate 12" is formed like a toothed wheel and openings 12"a are made in the tooth portions. The knock ring 13" includes a plurality of tongue pieces 13"b which extend in parallel to the axis of the shaft 1. These tongue pieces 13"b are inserted into openings 12"a of the keep plate 12", thereby preventing tongue pieces 13"b from opening outwardly with respect to shaft 1. Further, the free ends 13"c of tongue pieces 13"b are firmly attached to the peripheral portions of the follower ring 10" so as to avoid the rotation of the follower ring 10" with respect to shaft 1.

Meanwhile, in any of the above-exemplified devices, the fluid leakage through the mechanical sealing section cannot be completely avoided under severe use conditions of, for example, the compressor of an automobile cooler in which large vibration and temperature change are caused to occur.

In accordance with the proposal of the present inventors, however, it is possible to attain a quite excellent sealing effect by forming a plane land portion L in the peripheral portion of the sliding surface (i.e. the seal face) 10a of a follower ring 10 (including 10' and 10") and a plurality of holes (i.e. cavities) 20 in the inside portion of the sliding surface 10a as shown in FIGS. 5(A), 5(B), 5(C) and 5(D). By the way, the above term "inside portion" means the zone extending from the inside edge about two-thirds the distance toward the peripheral edge of the sliding surface 10a of the follower ring 10.

Figure 5A:
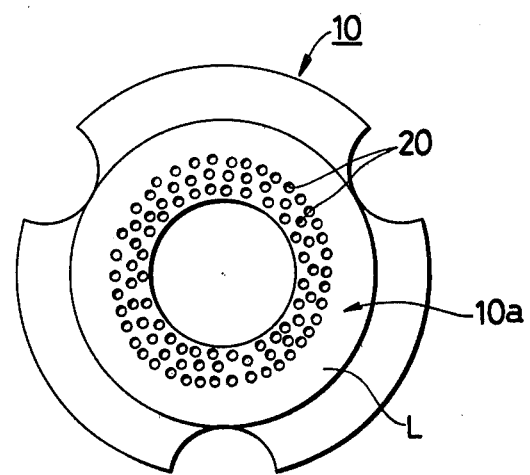
FIGS. 5(A), 5(B), 5(C) and 5(D) are plan views of the embodiments of follower rings that are used in the mechanical seal of the present invention.
Figure 5B:
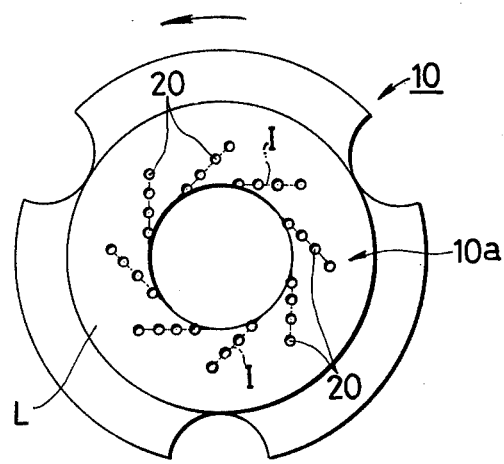
Figure 5C:
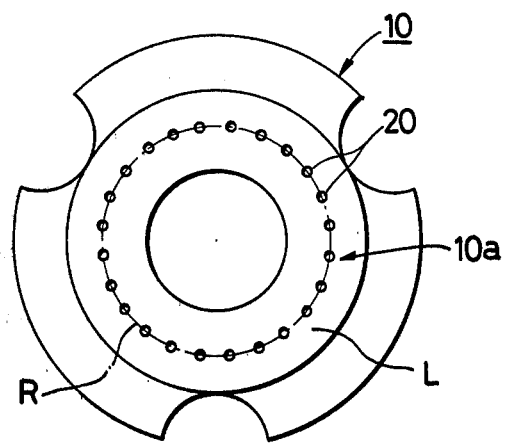
Figure 5D:
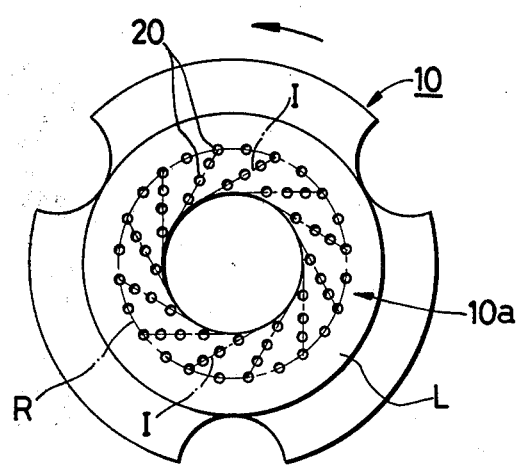

The above-mentioned holes 20 may be formed irregularly in the inside portion of the sliding surface 10a as shown in FIG. 5(A) or they may be formed regularly as shown in FIG. 5(B) in which a plurality of holes 20 are arranged on imaginary lines I which are inclined rearwardly relative to the rotational direction of the follower ring 10, thereby attaining a better sealing effect. It is considered that the plurality of holes 20 that are arrayed on the imaginary lines I on the whole, produce the same effect as that of the fine grooves. It is thus clear that a given hole, or cavity, 20 is not itself a groove, i.e. is not of length much greater than width, but rather of length generally similar to length as in holes 20 seen in FIGS. 5A–D. When the number of the imaginary lines I is increased, the holes 20 look as if they are arranged simply concentrically. Therefore, the arrangement of the holes 20 have a degree of freedom. For example, as shown in FIG. 5(C), a plurality of holes 20 may be formed on an imaginary circular line R, or even though it is not shown in the drawings, a plurality of imaginary circles are provided in the inside portion of the sliding surface 10a and a plurality of holes 20 are defined on each circle at regular intervals or with increasing the number of holes in the circles in the radially outer direction. Furthermore, as shown in FIG. 5(D), the holes 20 can be arranged in the combination of those of FIG. 5(B) and those of FIG. 5(C). That is, the holes 20 are formed along the imaginary lines I which are inclined rearwardly relative to the direction of rotation and the outermost holes 20 on the imaginary lines I are disposed on an imaginary circle R, and further, additional holes 20 are formed on this imaginary circle R. Meanwhile, the direction of the imaginary line is preferably perpendicular to the radius of the follower ring 10.

Figure 6A:
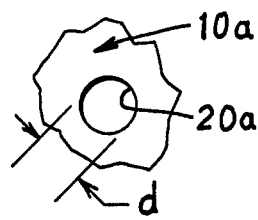
FIGS. 6(A), 6(B) and 6(C) are enlarged fragmentary plan views of embodiments of the sliding surface of follower rings showing holes respectively of circular, oval and rectangular plan.
Figure 6B:
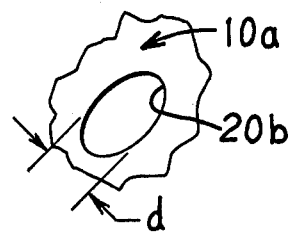
Figure 6C:
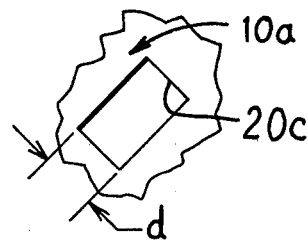

The shape of the above-described holes 20 in plan view as shown in the drawings may be a circle (e.g. at 20a in FIG. 6A), or it may be an oval (as at 20b in FIG. 6b), a rectangle (as at 20c in FIG. 6c) or any other suitable shape. Since the circular holes can be formed by either press work or drilling, they are advantageous as they can easily be formed as compared with the holes of other shapes. When a press die is used for forming the circular holes, a plurality of spherical bodies can be used for the formation. Since it is considered that the fluid pressure that is caused to occur in the holes 20 acts against the leakage flow of the fluid to prevent the leakage thereof, the dimension of these holes may desirably be small. However, when the size of the holes is so small as to be blocked up by abraded powder material during the rotation, it is meaningless. More particularly, the depth of the hole may be determined in the range of 0.01 to 1.0 mm and more preferably in the range of 0.05 to 1.0 mm. The smallest dimension across the mouth of the cavity, namely diameter of a circular hole or the width or shorter side dimension of an oval or rectangular, hole may be determined in the range of 0.1 to 1.0 mm with producing preferable results. The depths and diameters or shorter side lengths of a plurality of holes 20 can be varied from one another.

Together with the action of the land portion L in the periphery of the sliding surface 10a, the above-described follower ring 10 having the holes 20 in the inside portion of the sliding surface 10a gives an excellent sealing effect by the sliding contact with the seating ring 9 during the rotation of the rotary shaft 1. The mechanism of the above sealing effect is not entirely clear. However, it is considered that the leakage flow of fluid through the land portion L is scraped off by the holes 20 of the follower ring 10 and the fluid that is caught in the holes 20 is pushed back to the land portion L by the centrifugal force that is caused to occur in the holes 20, thereby attaining the excellent sealing effect.

Further, it is necessary that the position of the land portion L is set to the outside of the sliding surface 10a. When the positions of the land portion L and the holes 20 are reversed, the sealing effect becomes rather worse. It is considered that the fact depends upon the reason that the sealed fluid of the mixture of gas and liquid is easily introduced into the land portion from the area of holes, while the action to push the mixture back to the side of the sealed fluid cannot be obtained.

Although the present invention has been described in connection with peferred embodiments thereof, many variations and modifications will now become apparent to those skilled in the art. It is preferred, therefore, that the present invention be limited not by the specific disclosure herein but only by the appended claims.

What is claimed is:

1. In a mechanical seal for sealing a rotatable shaft with respect to a wall which is stationary relative to said rotatable shaft, said mechanical seal comprising an annular seating ring non-rotatably mounted on the wall and an annular follower ring mounted on the shaft for rotation therewith, said seating ring and said follower ring having opposed transverse annular seal faces, and including means for urging said seal faces into face-to-face sealing and rotatable sliding engagement with each other for sealing a pressurized fluid present in a first zone surrounding said follower ring from a second zone inside said seating ring, which second zone communicates with the ambient air, the improvement which comprises: the radially outer portion of said seal face of said follower ring is an annular, smooth, uninterrupted, land portion extending from the periphery of said seal face partway across the radial width of said seal face, said land portion being in sealing and rotatable sliding engagement with the portion of said seating ring that is opposed to said land portion, and the annular, radially inner portion of said seal face of said follower ring has a multitude of radially and circumferentially spaced-apart, discrete cavities therein distributed over the surface of said radially inner portion, said cavities being spaced also from both the radially inner and radially outer edges of said follower ring seal face, with the entire perimeter of each cavity being surrounded and thus closed by the follower ring seal face, said cavities being only in said radially inner portion, the depth of each said cavity being in the range of from 0.01 to 1.0 mm, the smallest dimension across the mouth of each said cavity, namely the width thereof, being in the range of from 0.1 to 1.0 mm, said radially inner portion extending up to about two-thirds of the distance from the radially inner edge to the radially outer edge of said seal face of said follower ring, so that fluid that leaks in a radially inward direction between said seal faces enters said cavities and is urged radially outwardly by centrifugal force generated by rotation of said follower ring relative to said seating ring.

2. The mechanical seal as defined in claim 1, wherein said multitude of cavities in said seal face of said follower ring are arranged in such a manner that the number of said cavities at the radially outer side of said radially inner portion is larger than the number of said cavities at the radially inner side of said radially inner portion.

3. The mechanical seal as defined in claim 1, wherein said plurality of cavities are arranged in spaced-apart relation along imaginary lines, which lines are circumferentially spaced from each other and are inclined rearwardly relative to the direction of the rotation of said follower ring.

4. The mechanical seal as defined in claim 1, wherein said plurality of cavities are disposed along a plurality of radially spaced, imaginary circles which are substantially concentric with the axis of rotation of said follower ring.

5. The mechanical seal as defined in claim 1, wherein said seal face of said seating ring is smooth and uninterrupted.

6. The mechanical seal as defined in claim 1, wherein said plurality of cavities are of circular shape in plan.

7. The mechanical seal as defined in claim 1, wherein said plurality of cavities are of rectangular shape in plan.

8. The mechanical seal as defined in claim 1, wherein said plurality of cavities are of oval shape in plan.

9. The mechanical seal as defined in claim 1, wherein said depth of each said cavity is in the range of from 0.1 to 0.5 mm and said smallest dimension across the mouth of each said cavity is in the range of from 0.1 to 0.5 mm.

10. The mechanical seal as defined in claim 1 wherein said cavities are spaced close to one another along at least one direction on said radially inner portion of said seal face of said follower ring, said seal face of said seating ring being smooth and uninterrupted, the depth of each said cavity being in the range of from 0.1–0.5 mm and said smallest dimension across the mouth of each cavity being in the range of from 0.1 to 0.5 mm.

11. The mechanical seal as defined in claim 10, wherein the number of said cavities at the radially outer side of said radially inner portion is at least as large as the number of said cavities at the radially inner side of said radially inner portion, at least some of said plurality of cavities being arranged in spaced-apart relation along imaginary lines, which lines are circumferentially spaced from each other and are inclined rearwardly relative to the direction of the rotation of said follower ring, said plurality of cavities also being disposed along at least three radially spaced, imaginary circles which are substantially concentric with the axis of rotation of said follower ring.

12. The mechanical seal as defined in claim 11, in which said cavities are semispherical indentations, formed by spherical bodies on a press die.

13. The mechanical seal as defined in claim 12, wherein said wall is part of the housing of the compressor of an automobile cooler and said shaft is the shaft of said compressor, said pressurized fluid consisting of a mixture of a gas and a liquid to be sealed in the inside of said compressor.

* * * * *